US012643597B2

(12) United States Patent
Omori

(10) Patent No.: US 12,643,597 B2
(45) Date of Patent: Jun. 2, 2026

(54) VEHICLE CONTROL DEVICE, VEHICLE CONTROL METHOD, AND STORAGE MEDIUM

(71) Applicant: TOYOTA JIDOSHA KABUSHIKI KAISHA, Toyota (JP)

(72) Inventor: Kosei Omori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 18/431,343

(22) Filed: Feb. 2, 2024

(65) Prior Publication Data

US 2024/0262414 A1 Aug. 8, 2024

(30) Foreign Application Priority Data

Feb. 7, 2023 (JP) .................................. 2023-016577

(51) Int. Cl.
 *B62D 6/00* (2006.01)
(52) U.S. Cl.
 CPC ...................................... *B62D 6/00* (2013.01)
(58) Field of Classification Search
 CPC ....... B62D 6/00; B62D 15/025; B60W 40/10; B60W 40/06
 USPC ......................................................... 701/41
 See application file for complete search history.

(56) References Cited

U.S. PATENT DOCUMENTS

| | | | |
|---|---|---|---|
| 7,692,534 B2 | 4/2010 | Kataoka et al. | |
| 8,352,124 B2 | 1/2013 | Taguchi | |

| | | | |
|---|---|---|---|
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,714,034 B2 | 7/2017 | Otake et al. | |
| 9,880,558 B2 | 1/2018 | Nakamura | |
| 9,902,399 B2 | 2/2018 | Torii et al. | |
| 10,345,443 B2 | 7/2019 | Masui et al. | |
| 10,611,240 B2 | 4/2020 | Masui et al. | |
| 2005/0270145 A1 | 12/2005 | Kataoka et al. | |

(Continued)

FOREIGN PATENT DOCUMENTS

| | | |
|---|---|---|
| JP | 2003-141694 A | 5/2003 |
| JP | 2008-195402 A | 8/2008 |
| JP | 2009-83811 A | 4/2009 |

(Continued)

OTHER PUBLICATIONS

JP-2019055744-A—English Translation (Year: 2017).*
JP-2023057931-A—English Translation (Year: 2021).*

*Primary Examiner* — Scott A Reinbold
(74) *Attorney, Agent, or Firm* — Sughrue Mion, PLLC

(57) ABSTRACT

A vehicle control device executes a lateral position control to control. In the lateral position control a lateral position of a vehicle in a travel area is controlled to maintain a predetermined target lateral position. An electronic control device of the vehicle control device controls, in the lateral position control, a controlled variable that is able to control the lateral position of the vehicle so as to match a target controlled variable acquired so that the lateral position maintains the target lateral position, controls the target controlled variable to be smaller than when the vehicle is traveling on a motorway, when the vehicle is traveling on a local road other than the motorway, and executes the lateral position control even when the vehicle is traveling on the local road.

13 Claims, 5 Drawing Sheets

(56) References Cited

U.S. PATENT DOCUMENTS

| | | | |
|---|---|---|---|
| 2019/0071080 | A1 | 3/2019 | Shimizu |
| 2022/0315039 | A1 | 10/2022 | Wada |

FOREIGN PATENT DOCUMENTS

| | | | | |
|---|---|---|---|---|
| JP | 4349210 | B2 | | 7/2009 |
| JP | 2009-190464 | A | | 8/2009 |
| JP | 2010-6279 | A | | 1/2010 |
| JP | 2019-46363 | A | | 3/2019 |
| JP | 2019055744 | A | * | 4/2019 |
| JP | 2022-154468 | A | | 10/2022 |
| JP | 2023057931 | A | * | 4/2023 |

* cited by examiner

FIG. 5

FIRST LOOKUP TABLE

| R | 0 TO 150 | 151 TO 300 | 301 OR MORE |
|---|---|---|---|
| Ga | 0.2 | 0.4 | 0.5 |

FIG. 6

SECOND LOOKUP TABLE

| WHITE LINE RELIABILITY | LOW | MEDIUM | HIGH |
|---|---|---|---|
| Ga | 0.2 | 0.4 | 0.5 |

FIG. 7

THIRD LOOKUP TABLE

| | 0 TO 150 | 151 TO 250 | 251 TO 300 | 301 OR MORE |
|---|---|---|---|---|
| LOW | 0.20 | 0.30 | 0.40 | 0.50 |
| MEDIUM | 0.25 | 0.35 | 0.45 | 0.50 |
| HIGH | 0.30 | 0.40 | 0.50 | 0.50 |

FIG. 8

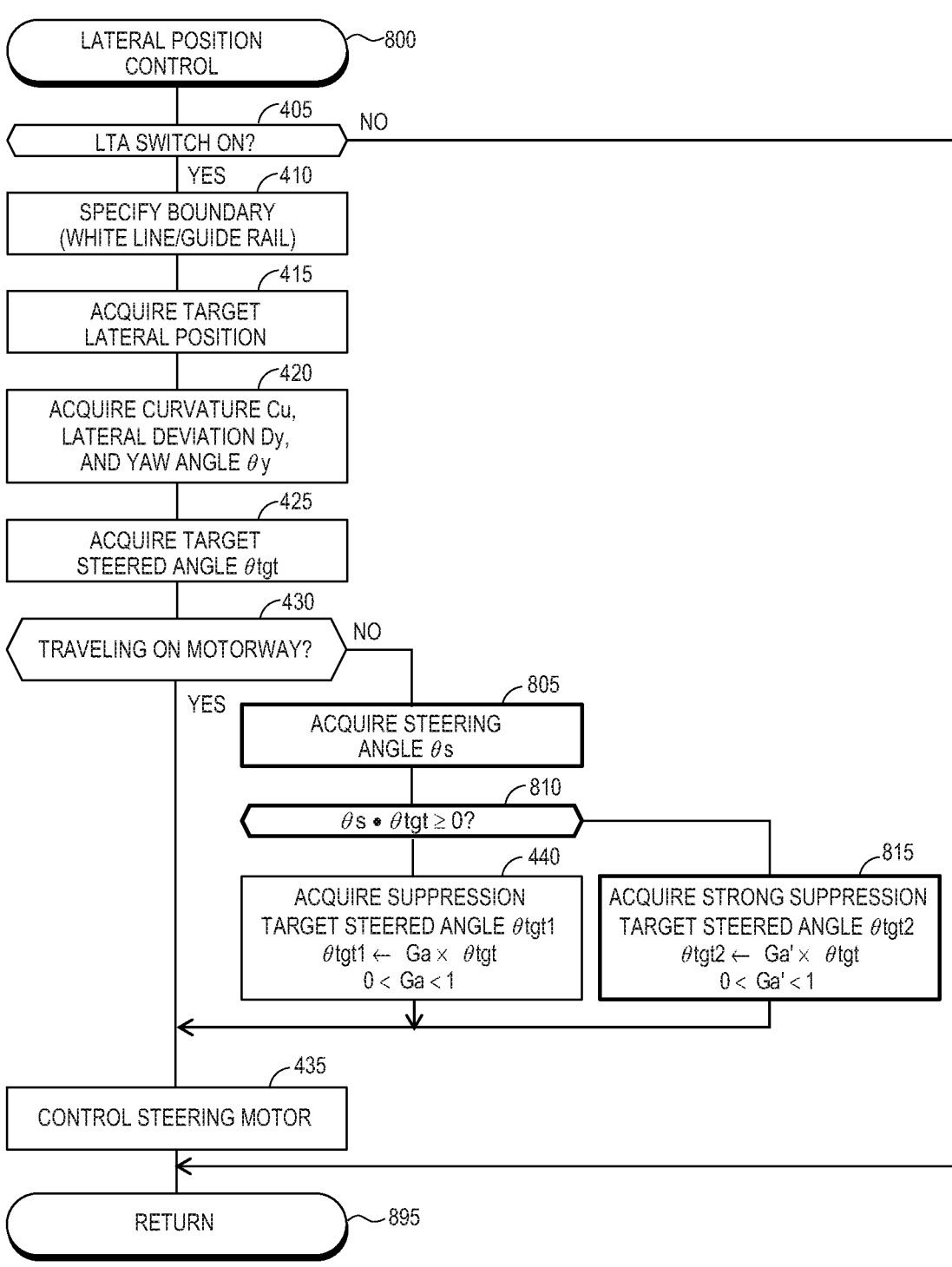

LATERAL POSITION CONTROL ~800

405 LTA SWITCH ON? NO

YES 410 SPECIFY BOUNDARY (WHITE LINE/GUIDE RAIL)

415 ACQUIRE TARGET LATERAL POSITION

420 ACQUIRE CURVATURE Cu, LATERAL DEVIATION Dy, AND YAW ANGLE θy

425 ACQUIRE TARGET STEERED ANGLE θtgt

430 TRAVELING ON MOTORWAY? NO

805 ACQUIRE STEERING ANGLE θs

810 θs • θtgt ≥ 0?

440 ACQUIRE SUPPRESSION TARGET STEERED ANGLE θtgt1 θtgt1 ← Ga × θtgt 0 < Ga < 1

815 ACQUIRE STRONG SUPPRESSION TARGET STEERED ANGLE θtgt2 θtgt2 ← Ga' × θtgt 0 < Ga' < 1

YES

435 CONTROL STEERING MOTOR

RETURN ~895

VEHICLE CONTROL DEVICE, VEHICLE CONTROL METHOD, AND STORAGE MEDIUM

CROSS-REFERENCE TO RELATED APPLICATION

This application claims priority to Japanese Patent Application No. 2023-016577 filed on Feb. 7, 2023, incorporated herein by reference in its entirety.

BACKGROUND

1. Technical Field

The present disclosure relates to a vehicle control device that executes lateral position control to control a lateral position of a vehicle in a travel area so that the vehicle travels in a predetermined target lateral position in the travel area, a vehicle control method in which a computer mounted on a vehicle executes the lateral position control, and a non-temporary storage medium storing an instruction for causing the computer to execute the lateral position control.

2. Description of Related Art

In recent years, a vehicle control device that executes lane keeping control (also known as LTA) or the like as the lateral position control has been known. LTA is an abbreviation for Lane Tracing Assist. When lateral position control is executed, such a vehicle control device controls a controlled variable for controlling a lateral position of a vehicle in a travel area such that it matches a "target controlled variable acquired for traveling at the target lateral position in the travel area".

For example, a vehicle control device (hereinafter referred to as "device of the related art") described in Japanese Unexamined Patent Application Publication No. 2003-141694 executes the lateral position control when the vehicle is traveling on a motorway, and executes lane departure warning control without executing the lateral position control when the vehicle is traveling on a local road other than a motorway.

The reason why the device of the related art does not execute the lateral position control when the vehicle is traveling on a local road is as follows. (1) Since there are parked vehicles and pedestrians on local roads, the lateral position control of the vehicle may not be appropriate. (2) On local roads, it may be difficult to recognize the white lines, so it may not be possible to set the target lateral position appropriately.

SUMMARY

It is desirable that the lateral position control be executed even when the vehicle is traveling on a local road. However, when the lateral position control is executed while the vehicle is traveling on a local road, the lateral position of the vehicle intended by a driver may not match the target lateral position of the lateral position control. When such a mismatch occurs, a direction in which the vehicle is heading by the lateral position control and a direction of a steering operation by the driver do not match (opposite to each other), so that there is a high possibility that the lateral position control will couple with the steering operation through the driver. When such coupling occurs, there is a high possibility that the lateral position control will cause the driver to feel discomfort.

The present disclosure provides a vehicle control device that executes lateral position control even when a vehicle is traveling on a local road, and reduces the possibility that the lateral position control will cause a driver to feel discomfort.

A first aspect of the disclosure relates to a vehicle control device that executes a lateral position control. In the lateral position control, a lateral position of a vehicle in a travel area is controlled to maintain a predetermined target lateral position. The vehicle control device includes an electronic control device. In the lateral position control, the electronic control device is configured to; control a controlled variable that is able to control the lateral position of the vehicle so as to match a target controlled variable acquired so that the lateral position maintains the target lateral position, control the target controlled variable to be smaller than when the vehicle is traveling on a motorway, when the vehicle is traveling on a local road other than the motorway, and execute the lateral position control even when the vehicle is traveling on the local road.

As described above, when the vehicle is traveling on a local road, a mismatch between the intended lateral position of the driver and the target lateral position is likely to occur. When such a mismatch occurs, the direction in which the vehicle moves as a result of the driver's steering operation is opposite to the direction caused by the lateral position control (in other words, the lateral position control may couple with the driver's steering operation). When such coupling occurs, there is a high possibility that the lateral position control will cause the driver to feel discomfort. Therefore, the device of the present disclosure executes lateral position control with a smaller target controlled variable when the vehicle is traveling on a local road than when the vehicle is traveling on a motorway. As a result, the lateral position control is executed even when the vehicle is traveling on a local road, and it is possible to reduce the possibility that the lateral position control, which is executed when the vehicle is traveling on a local road, causes the driver to feel discomfort.

In the first aspect, the electronic control device may be configured to control the target controlled variable to be smaller as a road curvature in a curved section becomes sharper when the vehicle is traveling on the local road.

Local roads tend to feature sharper curves than motorways. The sharper the curve, the more likely the driver will perform a steering operation. Therefore, the sharper the curve, the higher the possibility that the intended lateral position will not match the target lateral position, so that there is a higher the possibility that the lateral position control will couple with the steering operation through the driver. According to the above-described configuration, when the vehicle is traveling on a curved road on a local road, the sharper the curve, the smaller the target controlled variable. Therefore, the possibility of the lateral position control interfering with the steering operation of the driver is reduced, and the possibility of the lateral position control causing the driver to feel discomfort can be reduced.

In the first aspect, the vehicle control device may include a camera that acquires a front image by photographing an area in front of the vehicle. The electronic control device may be configured to recognize a white line as a boundary defining the travel area based on the front image, acquire the target lateral position based on the white line, and control the target controlled variable to be smaller as white line reliability representing certainty of recognition of the white line becomes lower when the vehicle is traveling on the local road.

A white line with low white line reliability is highly likely not to be the boundary of the travel area. When the target lateral position is acquired based on such a white line, there is a high possibility that the intended lateral position will not match the target lateral position. The white line reliability of local roads tends to be lower than that of motorways. This is because there is a high possibility that the white lines on local roads are blurry or disappear. Further, since there are more solid objects on local roads than on motorways, it is difficult to recognize white lines.

According to the above-described configuration, when the vehicle is traveling on a local road, the target controlled variable decreases as the white line reliability decreases, so that it is possible to reduce the possibility of the lateral position control causing the driver to feel discomfort.

In the first aspect, the vehicle control device may include a camera that acquires a front image by photographing an area in front of the vehicle. The electronic control device may be configured to recognize a white line as a boundary defining the travel area based on the front image, acquire the target lateral position based on the white line, and control the target controlled variable to be smaller as a road curvature in a curved section becomes sharper and make the target controlled variable smaller as white line reliability indicating certainty of recognition of the white line becomes lower when the vehicle is traveling on the local road.

According to the above-described configuration, when the vehicle is traveling on a local road, the target controlled variable becomes smaller as the road curvature becomes sharper and the white line reliability is lower, so it is possible to reduce the possibility of the lateral position control causing the driver to feel discomfort.

In the first aspect, when the vehicle is traveling on the local road, and a control direction in which the vehicle is moved by the lateral position control does not match an intended direction in which a driver intends to move the vehicle, the electronic control device may be configured to control the target controlled variable to be smaller than when the control direction and the intended direction match.

When the control direction and the intended direction do not match, there is a high possibility that the lateral position control will couple with the steering operation. According to this aspect, when the vehicle is traveling on a local road and the control direction and the intended direction do not match, the target controlled variable becomes smaller than when the control direction and the intended direction match. Therefore, it is possible to further reduce the possibility of the lateral position control causing the driver to feel discomfort.

A second aspect of the disclosure relates to a vehicle control method of a lateral position control executed by an electronic control device mounted on a vehicle. In the lateral position control a lateral position of the vehicle in a travel area being controlled to maintain a predetermined target lateral position. The vehicle control method, executed by the electronic control device, includes, controlling, in the lateral position control, a controlled variable that is able to control the lateral position of the vehicle so as to match a target controlled variable acquired so that the lateral position maintains the target lateral position, controlling the target controlled variable to be smaller than when the vehicle is traveling on a motorway, when the vehicle is traveling on a local road other than the motorway, and executing the lateral position control even when the vehicle is traveling on the local road.

A third aspect of the disclosure relates to a non-transitory storage medium storing instructions that are executable by one or more processors and that cause the one or more processors to perform functions. The one or more processors are mounted on a vehicle and configured to execute a lateral position control. In the lateral position control, a lateral position of the vehicle in the travel area being controlled to maintain a predetermined target lateral position. The functions include controlling, in the lateral position control, a controlled variable that is able to control the lateral position of the vehicle so as to match a target controlled variable acquired so that the lateral position maintains the target lateral position, controlling the target controlled variable to be smaller than when the vehicle is traveling on a motorway, when the vehicle is traveling on a local road other than the motorway, and executing the lateral position control even when the vehicle is traveling on the local road.

With each aspect described above, the lateral position control can be executed even when the vehicle is traveling on a local road, and it is possible to reduce the possibility of lateral position control, which is executed when the vehicle is traveling on a local road, causing the driver to feel discomfort.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is an explanatory diagram of a first lookup table of a first modification example of the embodiment of the present disclosure;

FIG. 6 is an explanatory diagram of a second lookup table of a second modification example of the embodiment of the present disclosure;

FIG. 7 is an explanatory diagram of a third lookup table of a third modification example of the embodiment of the present disclosure; and FIG. 8 is a flowchart of a lateral position control routine executed by a CPU of a vehicle control ECU of a vehicle control device according to a fourth modification example of the embodiment of the present disclosure.

DETAILED DESCRIPTION OF EMBODIMENTS

Figure 1:
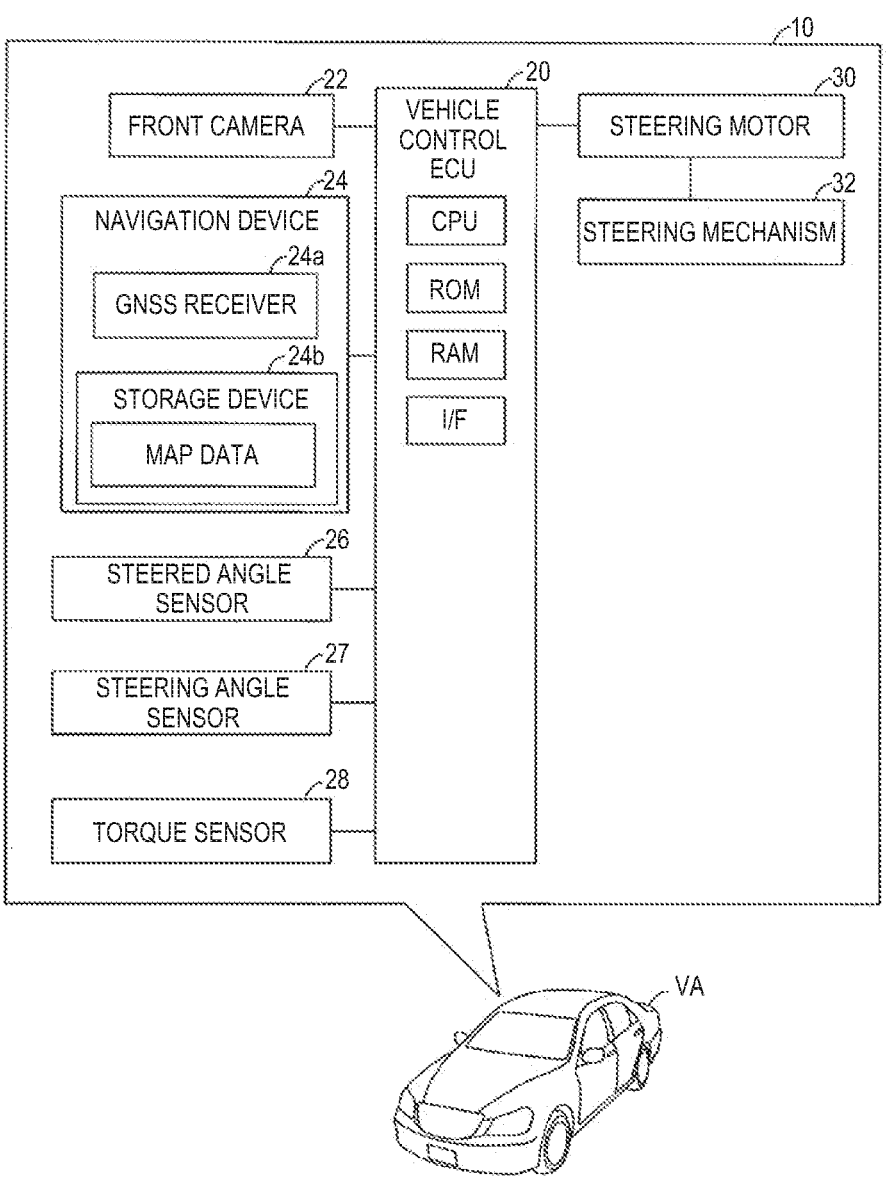
FIG. 1 is a schematic configuration diagram of a vehicle control device according to an embodiment of the present disclosure.

As illustrated in FIG. 1, a vehicle control device (hereinafter referred to as "main device 10") according to a present embodiment is applied to a vehicle VA and includes components illustrated in FIG. 1.

A vehicle control ECU 20 is an ECU that executes lateral position control to control a vehicle so that the lateral position of the vehicle VA in a travel area TA is maintained at a target lateral position Ltgt, and is hereinafter referred to as "ECU 20" or "electronic control device 20".

In this specification, "ECU" is an electronic control device that has a microcomputer as its main part. The ECU is also called a control unit, a controller, or a computer. The microcomputer includes a CPU (processor), a ROM, a RAM, an interface, and the like. At least one function realized by the ECU 20 may be realized by a plurality of ECUs.

A front camera 22 acquires a front image by photographing the scenery in front of the vehicle VA. The front camera 22 acquires boundary information based on the front image. The boundary information is information relating to the position of the "boundary defining the travel area in which the vehicle VA is currently traveling" with respect to the vehicle VA. Examples of boundaries include white lines and guardrails on roads. The front camera 22 transmits the boundary information to the ECU 20.

A navigation device 24 has a global navigation satellite system (GNSS) receiver 24a and a storage device 24b. The GNSS receiver 24a receives GNSS signals from a plurality of satellites. The GNSS signal is a signal for specifying the "latitude and longitude" representing the current position of the vehicle VA. Map data includes information that can specify whether the road is a motorway or a local road other than the motorway.

The navigation device 24 specifies the current position of the vehicle VA based on the GNSS signal, and specifies whether the road corresponding to the current position of the vehicle VA is a motorway or a local road based on the map data. The navigation device 24 transmits to the ECU 20 type information that can specify whether the road corresponding to the current position is a motorway or a local road.

A steered angle sensor 26 detects a steered angle θ of a steered wheel of the vehicle VA. The steering angle sensor 27 detects a steering angle θs representing a rotation angle of a steering wheel (not illustrated) from a neutral position. A torque sensor 28 detects a torque Tr representing torque acting on a steering shaft (not illustrated) connected to the steering wheel (not illustrated) of the vehicle VA. The ECU 20 acquires detected values of these sensors 26 to 28. As an example, the steered angle θ, the steering angle θs, and the torque Tr take positive values when the vehicle VA turns right, and take negative values when the vehicle VA turns left.

A steering motor 30 is incorporated in a steering mechanism 32. The steering mechanism 32 is a mechanism for steering the steered wheel according to the operation of the steering wheel. The steering motor 30 causes the steering mechanism 32 to generate automatic steering torque for changing the steered angle θ of the steered wheel in accordance with an instruction from the ECU 20.

Lateral Position Control

As described above, LTA is known as an example of lateral position control. LTA itself is well known, and for details, see, for example, Japanese Unexamined Patent Application Publication No. 2008-195402, Japanese Unexamined Patent Application Publication No. 2009-190464, Japanese Unexamined Patent Application Publication No. 2010-6279, and Japanese Patent No. 4349210. The LTA will be briefly described below.

Figure 2:
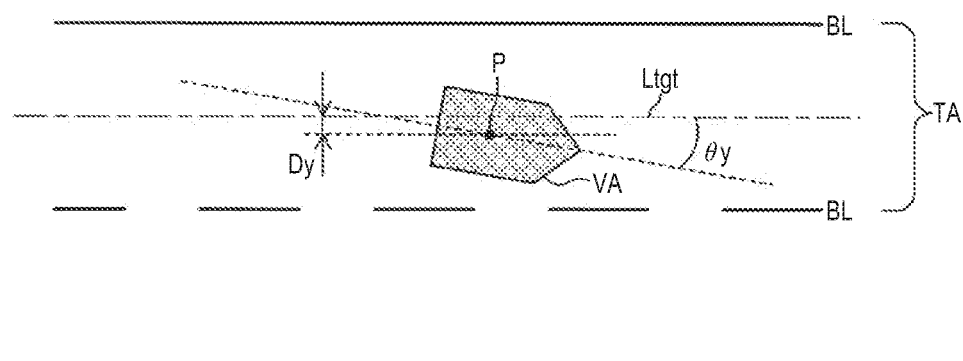
FIG. 2 is an explanatory diagram of an outline of lateral position control.

In the present embodiment, as illustrated in FIG. 2, the ECU 20 specifies the travel area TA defined by right and left boundaries BL specified based on the boundary information, and sets the center position of the right and left boundaries BL in a width direction as the target lateral position Ltgt. Further, the ECU 20 acquires a curvature Cu of the target lateral position Ltgt. In the present embodiment, the target lateral position Ltgt may be set at a position offset in a width direction of the travel area TA by a predetermined distance from the center position in the width direction of the right and left boundaries BL.

Further, the ECU 20 acquires a lateral deviation Dy and a yaw angle θy illustrated in FIG. 2. The lateral deviation Dy is a distance in the width direction of the travel area TA between "a reference point P preset at a predetermined position of the vehicle VA" and the target lateral position Ltgt. The yaw angle θy is an angle between a direction of the target lateral position Ltgt and a front-rear direction of the vehicle VA. As an example, the value of the lateral deviation Dy is positive when the reference point P is positioned on the right side of the target lateral position Ltgt, and is negative when positioned on the left side. The value of the yaw angle θy is positive when a front-rear direction of the vehicle VA is to the right of the direction of the target lateral position Ltgt, and is negative when it is to the left. The value of the curvature Cu is positive when the road curves to the right and negative when it curves to the left.

When an LTA switch (not illustrated) is set to an ON state, the ECU 20 applies the curvature Cu, the lateral deviation Dy, and the yaw angle θy to the following equation (1) to calculate a target steered angle θtgt of the steered wheel each time a predetermined calculation period elapses. The target steered angle θtgt is a target value of a controlled variable (steered angle θ) for controlling the lateral position of the vehicle VA, and is sometimes called a "target controlled variable". In the equation (1), K1, K2, K3, K4, and Kr are control gains and are constants.

$$\theta tgt = K1 \cdot Cu + Kr \cdot (K2 \cdot \theta y + K3 \cdot Dy + K4 \cdot \Sigma Dy) \tag{1}$$

In the above equation (1), the first term on the right side is a feedforward control term, which changes according to the shape of the target lateral position Ltgt. Also, in the above equation (1), the second term on the right side is a feedback control term, which functions to make the various deviations (θy, Dy, and ΣDy) zero. In particular, the term of K4·ΣDy is an integral control term and functions to eliminate the stationary lateral deviation Dy.

The ECU 20 controls the steering motor 40 so that the steered angle θ matches the target steered angle θtgt.

Outline of Operation

The ECU 20 receives the type information from the navigation device 24 and determines whether the vehicle VA is traveling on a motorway or a local road based on the type information. When the ECU 20 determines that the vehicle VA is traveling on a motorway, the ECU 20 controls the steering motor 40 such that the steered angle θ matches the target steered angle θtgt (in other words, lateral position control is executed using the target steered angle θtgt). On the other hand, when the ECU 20 determines that the vehicle VA is traveling on a local road, the ECU 20 controls the steering motor 40 such that the steered angle θ matches a suppression target steered angle θtgt1 smaller than the target steered angle θtgt acquired as described above (in other words, lateral position control is executed using the suppression target steered angle θtgt1).

The ECU 20 acquires the suppression target steered angle θtgt1 by multiplying the target steered angle θtgt by a predetermined gain Ga. The gain Ga is set to a value greater than "0" and less than "1".

When the vehicle VA is traveling on a local road, a mismatch between the lateral position intended by a driver and the target lateral position Ltgt is more likely to occur than when the vehicle VA is traveling on a motorway. The above (1) and (2) are considered as the cause of this. Another possible cause is that "local roads feature more curves than motorways, and these curves often tend to be sharper than those of the motorways". This is because the driver's steering operation may be required on a sharply curved road (details will be described below). When the mismatch occurs, the lateral position control may couple with the driver's steering operation, and the lateral position control may cause the driver to feel discomfort.

In the present embodiment, when the vehicle VA is traveling on a local road, the lateral position control is executed using the suppression target steered angle θtgt1. As a result, the lateral position control can be executed even when the vehicle VA is traveling on a local road. Also, even when the lateral position intended by the driver does not match the target lateral position Ltgt when the vehicle VA is traveling on a local road, the coupling can be weakened, so the possibility of the lateral position control causing the driver to feel discomfort can be reduced.

Operation Example

An operation example of the main device 10 will be described with reference to FIG. 3.

Figure 3:
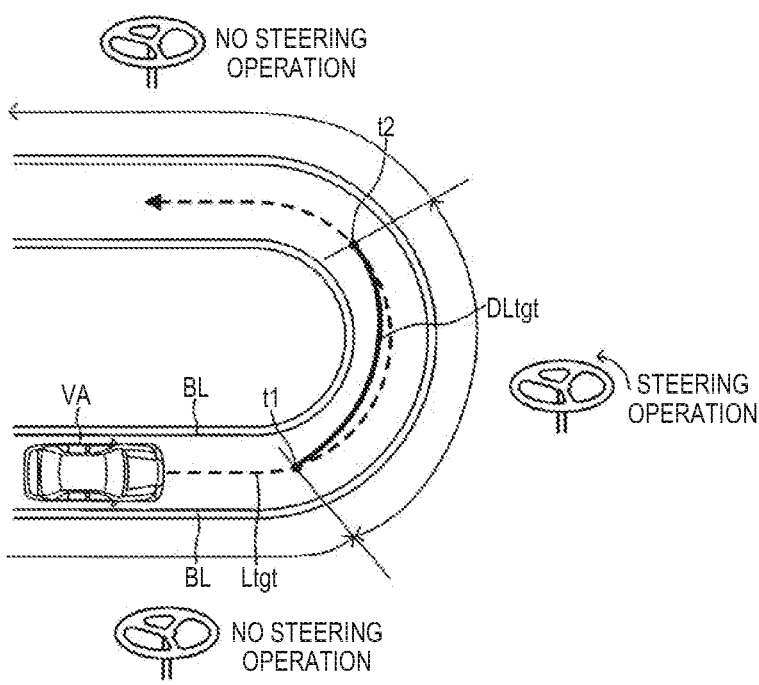
FIG. 3 is an explanatory diagram of a difference between a target lateral position and an intended lateral position when a vehicle is traveling on a curved section on a local road.

FIG. 3 illustrates an example in which the vehicle VA travels on a curved section on a local road when the ECU 20 is executing the lateral position control. In this case, the driver performs a steering operation during a period from a time t1 to a time t2. It is assumed that the driver steers the steering wheel to the left so that the vehicle VA travels at an intended lateral position DLtgt indicated by the thick line in FIG. 3.

In the lateral position control, the lateral position of the vehicle VA is controlled within a range that does not exceed an upper limit lateral acceleration, so only by controlling the lateral position of the vehicle VA by the lateral position control, there is a possibility that the vehicle VA will not be able to negotiate a sharp curve on a curved road (having a small curvature radius R). Therefore, in the example illustrated in FIG. 3, the driver performs the steering operation during the period from the time t1 to the time t2.

As illustrated in FIG. 3, the intended lateral position DLtgt is located to the left (inner side) of the target lateral position Ltgt. When the driver is performing the above steering operation, the vehicle VA is positioned to the left of the target lateral position Ltgt, so that the ECU 20 acquires the target steered angle θtgt that causes the vehicle VA to move to the right. Therefore, the ECU 20 controls the steered angle θ to match the target steered angle θtgt. That is, the steering direction (control direction) by the lateral position control is opposite to the steering direction by the driver, so that the lateral position control couples with the steering operation through the driver. When such coupling occurs, there is a high possibility that the lateral position control will cause the driver to feel discomfort.

There are more sharp curves on local roads than on motorways. Therefore, when the vehicle VA is traveling on a local road, there is a high possibility that the lateral position control will cause the driver to feel discomfort. Therefore, the ECU 20 executes the lateral position control using the suppression target steered angle θtgt1 when the vehicle VA is traveling on a local road. As a result, even when coupling occurs, the degree of interference is small, so that the possibility that the lateral position control will cause the driver to feel discomfort can be reduced.

Specific Operation

Lateral Position Control Routine

Figure 4:
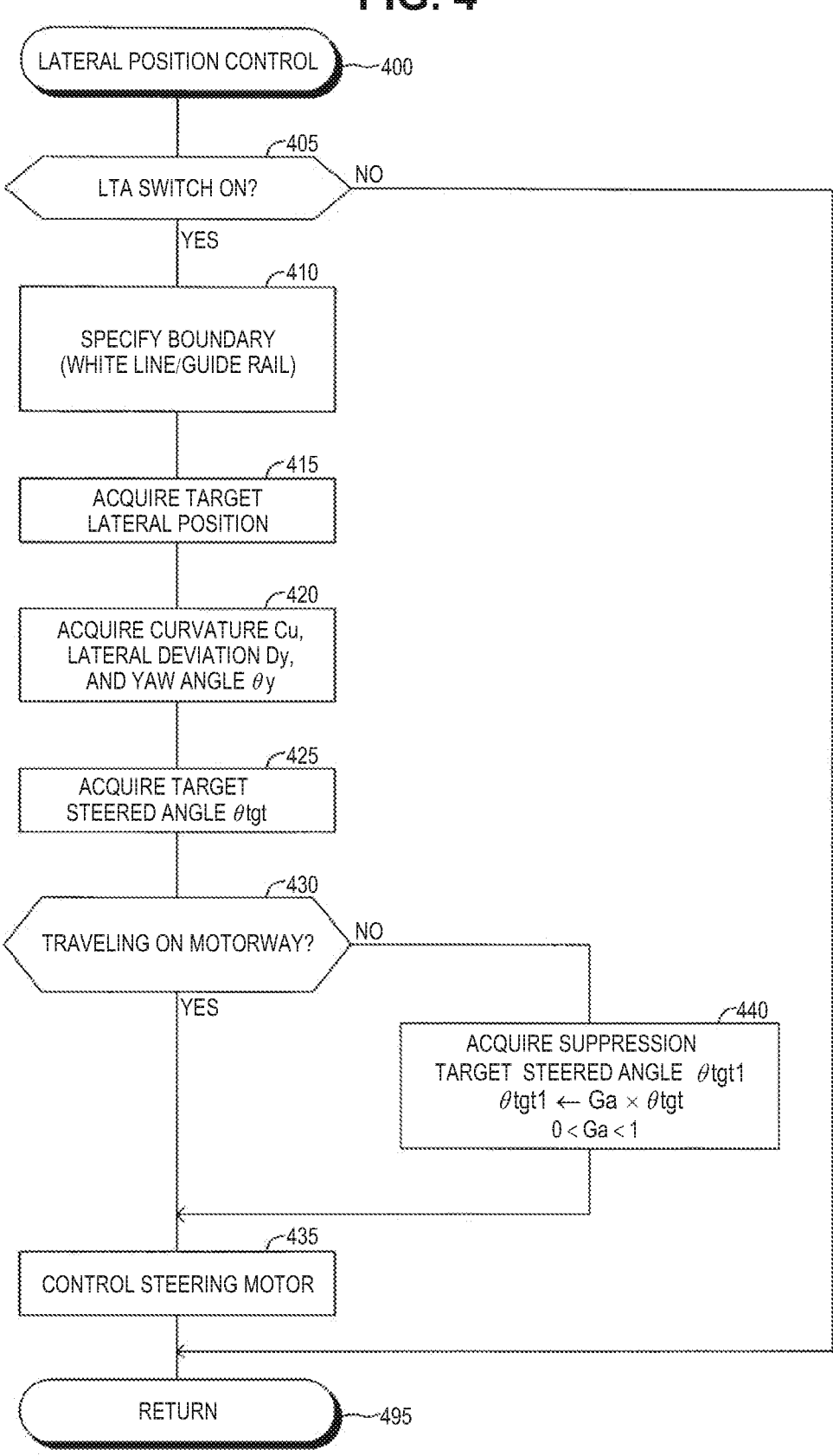
FIG. 4 is a flowchart of a lateral position control routine executed by a CPU of a vehicle control ECU illustrated in FIG. 1.

The CPU of the ECU 20 executes the routine illustrated by the flowchart in FIG. 4 each time a predetermined period of time elapses.

When the appropriate time comes, the CPU starts processing from step 400 in FIG. 4 and proceeds to step 405. In step 405, the CPU determines whether the LTA switch (not illustrated) is in an ON state.

When the LTA switch is in an OFF state, the CPU makes a "No" determination in step 405, proceeds to step 495, and temporarily terminates this routine.

When the LTA switch is in an ON state, the CPU determines "Yes" in step 405 and executes steps 410 to 430.

Step 410: The CPU specifies the position of the boundary BL with respect to the vehicle VA based on the boundary information.

Step 415: The CPU specifies the travel area TA based on the boundary BL specified in step 410, and acquires the target lateral position Ltgt in the travel area TA.

Step 420: The CPU specifies the curvature Cu of the target lateral position Ltgt and the lateral deviation Dy and yaw angle θy for the target lateral position Ltgt of the vehicle VA.

Step 425: The CPU acquires the target steered angle θtgt by applying the curvature Cu, the lateral deviation Dy, and the yaw angle θy to the above equation (1).

Step 430: Based on the type information, the CPU determines whether the vehicle VA is traveling on a motorway or a local road.

When the vehicle VA is traveling on a motorway, the CPU determines "Yes" in step 430 and proceeds to step 435. In step 435, the CPU controls the steering motor 40 so that the steered angle θ matches the target steered angle θtgt. Then, the CPU proceeds to step 495 and once terminates this routine.

When the vehicle VA is traveling on a local road, the CPU determines "No" in step 430 and proceeds to step 440. In step 440, the CPU acquires the suppression target steered angle θtgt1 by multiplying the target steered angle θtgt by the gain Ga. Then, the CPU controls the steering motor 40 so that the steered angle θ detected by the steered angle sensor 26 matches the suppression target steered angle θtgt1. Next, the CPU proceeds to step 495 and once terminates this routine.

As described above, the main device 10 executes the lateral position control using the suppression target steered angle θtgt1 smaller than the target steered angle θtgt when the vehicle VA is traveling on a local road. As a result, when the vehicle VA is traveling on a local road, it is possible to perform the lateral position control with a low possibility of giving the driver a sense of discomfort.

The present disclosure is not limited to the embodiment described above, and various modification examples can be adopted within the scope of the present disclosure.

First Modification Example

The ECU 20 of the vehicle control device 10 according to this modification example reduces the suppression target steered angle θtgt1 as the curvature radius R of the target lateral position Ltgt decreases (that is, the sharper the curve) when the vehicle VA is traveling on a local road.

The ROM of the ECU 20 stores a first lookup table illustrated in FIG. 5. The first lookup table defines a relationship between the curvature radius R and the gain Ga such that the smaller the curvature radius R, the smaller the gain Ga. The gain Ga defined in the first lookup table is a value larger than "0" and smaller than "1" (the same applies to second and third lookup tables, which will be described below).

When the ECU 20 determines that the vehicle VA is traveling on a local road (step 430 "No" illustrated in FIG. 4), the ECU 20 acquires the curvature radius R based on the curvature Cu, and acquires the gain Ga by applying the curvature radius R to the first lookup table.

Then, in step 440 illustrated in FIG. 4, the ECU 20 acquires the suppression target steered angle θtgt1 using the gain Ga corresponding to the curvature radius R as the gain Ga in the equation (1).

The sharper the curve, the higher the possibility that the driver will need to perform a steering operation. Therefore, the sharper the curve, the more likely the lateral position control will cause the driver to feel discomfort. According to this modification example, when the vehicle VA is traveling on a local road, the target steered angle θtgt becomes smaller as the curve becomes sharper, so it is possible to increase the possibility that the vehicle VA can travel in the target lateral position Ltgt while reducing the possibility that the driver will feel discomfort.

Second Modification Example

The ECU 20 of the vehicle control device 10 according to this modification example reduces the suppression target steered angle θtgt1 as a white line reliability WD is lower when the vehicle VA is traveling on a local road.

The white line reliability WD represents the certainty of the white line being recognized as the boundary BL. The lower the white line reliability WD, the lower the certainty. As an example, the ECU 20 acquires the white line reliability such that the lower the edge strength, the lower the white line reliability.

The ROM of the ECU 20 stores a second lookup table illustrated in FIG. 6. The second lookup table defines a relationship between the white line reliability WD and the gain Ga such that the lower the white line reliability WD, the smaller the gain Ga.

When the ECU 20 determines that the vehicle VA is traveling on a local road (step 430 "No" illustrated in FIG. 4), the ECU 20 acquires the white line reliability WD based on the forward image, and acquires the gain Ga by applying the white line reliability WD to the second lookup table. In step 440 illustrated in FIG. 4, the ECU 20 acquires the suppression target steered angle θtgt1 using the above gain Ga as the gain Ga in the equation (1).

A white line with a low white line reliability WD is highly likely not to be the boundary BL of the travel area TA. When such a white line is used as the boundary BL, the target lateral position Ltgt is set at a position deviated from the original target lateral position Ltgt. The target lateral position Ltgt set in this way is highly likely not to match the intended lateral position DLtgt due to deviation from the target lateral position Ltgt when the boundary BL is normally recognized. Therefore, there is a high possibility that the lateral position control will cause the driver to feel discomfort. On local roads, the possibility of blurring and disappearance of white lines is higher than on motorways. Furthermore, since there are more solid objects on local roads than on motorways, white lines on local roads are more difficult to recognize than on motorways. Thus, the white line reliability on local roads tends to be lower than on motorways. According to this modification example, when the vehicle VA is traveling on a local road, the target steered angle θtgt becomes smaller as the white line reliability WD becomes lower, so that the possibility of the lateral position control causing the driver to feel discomfort can be further reduced.

The camera 22 may acquire the white line reliability WD based on the forward image.

Third Modification Example

When the vehicle VA is traveling on a local road, the ECU 20 of the vehicle control device 10 according to this modification example decreases the suppression target steered angle θtgt1 as the curvature radius R of the target lateral position Ltgt is smaller, and decreases the suppression target steered angle θtgt1 as the white line reliability WD is lower.

The ROM of the ECU 20 stores a third lookup table illustrated in FIG. 7. The third lookup table defines a relationship between the "curvature radius R and white line reliability WD" and the gain Ga such that the smaller the curvature radius R, the smaller the gain Ga, and the lower the white line reliability WD, the smaller the gain Ga.

When the ECU 20 determines that the vehicle VA is traveling on a local road (step 430 "No" illustrated in FIG. 4), the ECU 20 acquires the curvature radius R, the white line reliability WD, and the gain Ga by applying the curvature radius R and the white line reliability WD to the third lookup table. In step 440 illustrated in FIG. 4, the ECU 20 acquires the suppression target steered angle θtgt1 using the above gain Ga as the gain Ga in the equation (1).

With this modification example, it is possible to increase the possibility that the vehicle VA can travel in the target lateral position Ltgt while further reducing the possibility of the vehicle VA causing the driver to feel discomfort while traveling on a local road.

Fourth Modification Example

When the lateral position control couples with the steering operation through the driver when the vehicle VA is traveling on a local road, the ECU 20 of the vehicle control device 10 according to this modification example acquires a strong suppression target steered angle θtgt2 that is even smaller than the suppression target steered angle θtgt1, and uses the strong suppression target steered angle θtgt2 to perform the lateral position control.

The CPU of the ECU 20 executes a lateral position control routine according to the flowchart in FIG. 8 instead of the lateral position control routine illustrated in the flowchart in FIG. 4. Among the steps illustrated in FIG. 8, the similar steps as in FIG. 4 are given the same reference numerals as in FIG. 4, and the description thereof will be omitted.

When the CPU determines "Yes" in step 405 illustrated in FIG. 8, the CPU executes steps 410 to 430 illustrated in FIG. 8. The CPU executes steps 805 and 810 when the vehicle VA is traveling on a local road (step 430 "No" illustrated in FIG. 8).

Step 805: The CPU acquires a steering angle θs based on the detected value from the steering angle sensor 27. Step 810: The CPU determines whether the multiplication value of the steering angle θs and the target steered angle θtgt is 0 or more.

When the multiplication value is 0 or more, a direction (control direction) in which the vehicle moves by the lateral position control is the same as a direction (intended direction) in which the driver intends to move the vehicle, so that there is a high possibility that the lateral position control will not couple with the steering operation. In this case, the CPU determines "Yes" in step 810, proceeds to step 440 illustrated in FIG. 8, and acquires the suppression target steered angle θtgt1. Then, the CPU executes step 435 illustrated in FIG. 8, proceeds to step 895, and once terminates this routine.

When the multiplication value is 0 or less, the control direction and the intended direction do not match, so that there is a high possibility that the lateral position control will couple with the steering operation. In this case, the CPU determines "No" in step 810 and proceeds to step 815.

In step 815, the CPU acquires a strong suppression target steered angle θtgt2 by multiplying the target steered angle θtgt by a gain Ga' set to a value smaller than the gain Ga. Then, in step 435 illustrated in FIG. 8, the CPU controls the steering motor 40 so that the steered angle θ matches the strong suppression target steered angle θtgt2. Then, the CPU proceeds to step 895 and once terminates this routine.

As described above, when the vehicle VA is traveling on a local road and the lateral position control couples with the steering operation through the driver, the lateral position control is executed using the strong suppression target steered angle θtgt2. As a result, it is possible to further reduce the possibility that the lateral position control will cause the driver to feel discomfort when the vehicle VA is traveling on a local road.

Fifth Modification Example

The ECU 20 of the vehicle control device 10 according to this modification example may determine whether the vehicle VA is traveling on a motorway or a local road based on the forward image without using the navigation device 24. As an example, the ECU 20 determines that the vehicle VA is traveling on a motorway when the width of the travel area TA is equal to or greater than a predetermined threshold width, whereas the ECU 20 determines that the vehicle VA is traveling on a local road when the width of the travel area TA is less than a predetermined threshold width.

Sixth Modification Example

In the above embodiment, the steered angle θ is taken as an example of the controlled variable controlled by the lateral position control, but the controlled variable is not limited to this. The controlled variable may be any value that can control the lateral position of the vehicle VA, and may be the torque Tr acting on a steering shaft (not illustrated), for example. In this case, the ECU 20 controls the steering motor 30 so that the torque Tr detected by the torque sensor 28 matches a target torque Trtgt.

The main device 10 is applicable to vehicles such as engine vehicles, hybrid vehicles, plug-in hybrid vehicles, fuel cell vehicles, and electric vehicles. Further, the main device 10 is also applicable to autonomous driving vehicles. Further, the present disclosure can be regarded as a computer-readable non-temporary storage medium in which a program for realizing the functions of the main device 10 is stored.

The aspects of the present disclosure are summarized below. A first aspect of the disclosure relates to a vehicle control device that executes a lateral position control. In the lateral position control, a lateral position of a vehicle in a travel area (TA) is controlled to maintain a predetermined target lateral position (Ltgt). The vehicle control device includes an electronic control device. In the lateral position control, the electronic control device is configured to; control a controlled variable (θ) that is able to control the lateral position of the vehicle so as to match a target controlled variable (θtgt) acquired so that the lateral position maintains the target lateral position (step 435), control the target controlled variable to be smaller than when the vehicle is traveling on a motorway (step 430 "Yes"), when the vehicle is traveling on a local road other than the motorway (step 430 "No", step 440), and execute the lateral position control even when the vehicle is traveling on the local road (step 430 "No", step 440 and step 435).

In the first aspect, the electronic control device may be configured to control the target controlled variable to be smaller as a road curvature in a curved section becomes sharper when the vehicle is traveling on the local road (step 430 "No", step 440 and FIG. 5).

In the first aspect, the vehicle control device may include a camera that acquires a front image by photographing an area in front of the vehicle. The electronic control device may be configured to recognize a white line as a boundary defining the travel area based on the front image (step 410), acquire the target lateral position based on the white line (step 415), and control the target controlled variable to be smaller as white line reliability representing certainty of recognition of the white line becomes lower when the vehicle is traveling on the local road (step 430 "No", step 440, FIG. 6 and FIG. 7).

In the first aspect, the vehicle control device may include a camera that acquires a front image by photographing an area in front of the vehicle. The electronic control device may be configured to recognize a white line as a boundary defining the travel area based on the front image (step 410), acquire the target lateral position based on the white line (step 415), and control the target controlled variable to be smaller as a road curvature in a curved section becomes sharper and make the target controlled variable smaller as white line reliability indicating certainty of recognition of the white line becomes lower when the vehicle is traveling on the local road (step 430 "No", step 440 and FIG. 7).

In the first aspect, when the vehicle is traveling on the local road (step 430 "No" in FIG. 8), and a control direction in which the vehicle is moved by the lateral position control does not match an intended direction in which a driver intends to move the vehicle (step 810 "No"), the electronic control device may be configured to control the target controlled variable to be smaller than when the control direction and the intended direction match (step 815).

A second aspect of the disclosure relates to a vehicle control method of a lateral position control executed by an electronic control device mounted on a vehicle. In the lateral position control a lateral position of the vehicle in a travel area (TA) being controlled to maintain a predetermined target lateral position (Ltgt). The vehicle control method, executed by the electronic control device, includes, controlling, in the lateral position control, a controlled variable (θ) that is able to control the lateral position of the vehicle so as to match a target controlled variable (θtgt) acquired so that the lateral position maintains the target lateral position (step 435), controlling the target controlled variable to be smaller than when the vehicle is traveling on a motorway (step 430 "Yes", step 440), when the vehicle is traveling on a local road other than the motorway (step 430 "No"), and executing the lateral position control even when the vehicle is traveling on the local road (step 430 "No", step 440, step 435).

A third aspect of the disclosure relates to a non-transitory storage medium storing instructions that are executable by one or more processors and that cause the one or more processors to perform functions. The one or more processors are mounted on a vehicle and configured to execute a lateral position control. In the lateral position control, a lateral position of the vehicle in the travel area (TA) being controlled to maintain a predetermined target lateral position (Ltgt). The functions include controlling, in the lateral position control, a controlled variable (θ) that is able to control the lateral position of the vehicle so as to match a target controlled variable (θtgt) acquired so that the lateral position maintains the target lateral position (step 435), controlling the target controlled variable to be smaller than when the vehicle is traveling on a motorway (step 430 "Yes", step 440), when the vehicle is traveling on a local road other than the motorway (step 430 "No"), and executing the lateral position control even when the vehicle is traveling on the local road (step 430 "No", step 440, step 435).

What is claimed is:

1. A vehicle control device configured to execute a lateral position control wherein, by the lateral position control, a lateral position of a vehicle traveling in a travel area is controlled to maintain a predetermined target lateral position, the vehicle control device comprising:

an electronic control device that is, in executing the lateral position control, configured to:

control a controlled variable, by which the lateral position of the vehicle is controlled, to match a target controlled variable;

determine that the travel area, in which the vehicle is traveling, is a local road;

control the target controlled variable based on determining that the travel area, in which the vehicle is traveling, is the local road; and execute the lateral position control based on the target controlled variable that is controlled based on determining that the travel area, in which the vehicle is traveling, is the local road.

2. The vehicle control device according to claim 1, wherein the travel area is of the local road, and the electronic control device is further configured to control the target controlled variable based on a sharpness of a road curvature in a curved section of the travel area.

3. The vehicle control device according to claim 1 further comprising:

a camera configured to acquire a front image by photographing an area in front of the vehicle, wherein the electronic control device is further configured to:

recognize, based on the front image, a white line, wherein recognizing the white line based on the front image comprises recognizing the white line as a boundary of the travel area;

acquire the target lateral position based on the white line; and control the target controlled variable based on a white line reliability representing a certainty of recognizing the white line.

4. The vehicle control device according to claim 1 further comprising:

a camera configured to acquire a front image by photographing an area in front of the vehicle, wherein the electronic control device is further configured to:

recognize, based on the front image, a white line as a boundary of the travel area;

acquire the target lateral position based on the white line;

control the target controlled variable based on a sharpness of a road curvature in a curved section of the travel area; and control the target controlled variable based on a white line reliability representing a certainty of recognizing the white line.

5. The vehicle control device according to claim 1, wherein the electronic control device is further configured to:

determine, as the vehicle is traveling on the local road, whether a control direction, in which the vehicle is moved by the lateral position control, does not match an intended direction in which a driver of the vehicle intends to move the vehicle; and controlled variable based on determining whether the control direction does not match the intended direction.

6. A vehicle control method of a lateral position control executed by an electronic control device mounted on a vehicle, wherein, by the lateral position control, a lateral position of the vehicle traveling in a travel area is controlled to maintain a predetermined target lateral position, and the vehicle control method, executed by the electronic control device, comprises:

controlling, in the lateral position control, a controlled variable, by which the lateral position of the vehicle is controlled, to match a target controlled variable;

determining that the travel area, in which the vehicle is traveling, is a local road;

controlling the target controlled variable based on determining that the travel area, in which the vehicle is traveling, is the local road, and executing the lateral position control based on the target controlled variable that is controlled based on determining that the travel area, in which the vehicle is traveling, is the local road.

7. A non-transitory storage medium storing instructions that are executable by one or more processors and that cause the one or more processors to perform functions, the one or more processors being mounted on a vehicle and configured to execute a lateral position control, wherein, in the lateral position control, a lateral position of the vehicle traveling in a travel area is controlled to maintain a predetermined target lateral position, the functions comprising:

controlling, in the lateral position control, a controlled variable, by which the lateral position of the vehicle is controlled, to match a target controlled variable;

determining that the travel area, in which the vehicle is traveling, is a local road;

controlling the target controlled variable based on determining that the travel area, in which the vehicle is traveling, is the local road; and executing the lateral position control based on the target controlled variable that is controlled based on determining that the travel area, in which the vehicle is traveling, is the local road.

8. The vehicle control device according to claim 1, wherein the electronic control device is further configured to:

reduce the target controlled variable based on determining that the travel area, in which the vehicle is traveling, is the local road and is not the motorway, wherein controlling the target control variable is further based on determining a curve of the local road, a white line reliability of a white line of the local road, and an intention of a driver of the vehicle.

9. The vehicle control device according to claim 1, wherein the electronic control device is further configured to maintain the lateral position at the target lateral position by controlling the controlled variable to match the target controlled variable.

10. The vehicle control device according to claim 2, wherein the electronic control device is further configured to:

determine an increase in the sharpness of the road curvature; and control the target controlled variable by increasing a gain of the target controlled variable based on the increase in the sharpness of the road curvature.

11. The vehicle control device according to claim 3, wherein the electronic control device is further configured to:

determine an increase in the certainty of recognizing the white line; and control the target controlled variable by increasing a gain of the target controlled variable based on the increase in the certainty of recognizing the white line.

12. The vehicle control device according to claim 4, wherein the electronic control device is further configured to:

determine an increase in the sharpness of the road curvature;

control the target controlled variable by increasing a gain of the target controlled variable based on the increase in the sharpness of the road curvature;

determine an increase in the certainty of recognizing the white line; and control the target controlled variable by increasing a gain of the target controlled variable based on the increase in the certainty of recognizing the white line.

13. The vehicle control device according to claim 1, wherein determining that the travel area, in which the vehicle is traveling, is the local road is further based on determining a width of the travel area.

* * * * *